J. P. DAVIS.
FLY TRAP.
APPLICATION FILED OCT. 7, 1912.

1,096,355.

Patented May 12, 1914.

Witnesses

J. P. Davis,
Inventor by
Attorneys

UNITED STATES PATENT OFFICE.

JEPTHA P. DAVIS, OF BOONEVILLE, ARKANSAS.

FLY-TRAP.

1,096,355.

Specification of Letters Patent.

Patented May 12, 1914.

Application filed October 7, 1912. Serial No. 724,406.

*To all whom it may concern:*

Be it known that I, JEPTHA P. DAVIS, a citizen of the United States, residing at Booneville, in the county of Logan and State of Arkansas, have invented a new and useful Fly-Trap, of which the following is a specification.

The objects of the invention are to provide a fly trap which may readily be cleaned and which may be fashioned at a trifling expense.

The invention aims, further, to provide a fly trap, the foraminous covering of which constitutes means for maintaining the upper and lower frames assembled with the corner posts.

Another object of the invention is to provide a fly trap, the receptacle portion of which may be swung readily to one side, to permit a cleaning of the trap.

Another object of the invention is to provide a fly trap having in its top, a movable closure member coöperating with a conical leader which is located in the base of the trap.

The invention aims further, to increase the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
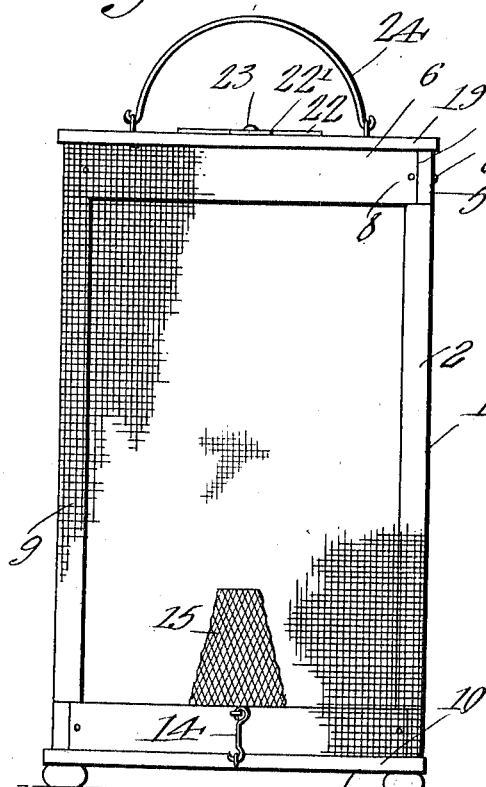
Figure 2:
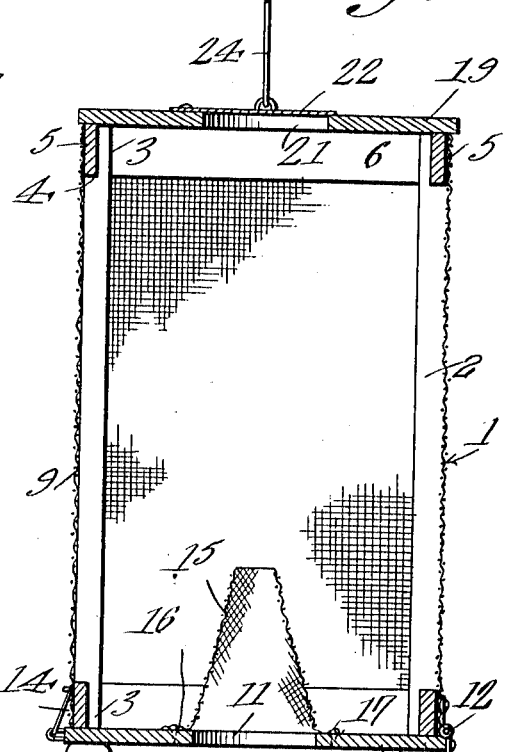
Figure 3:
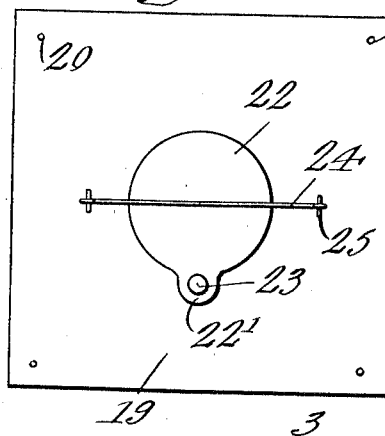
Figure 4:
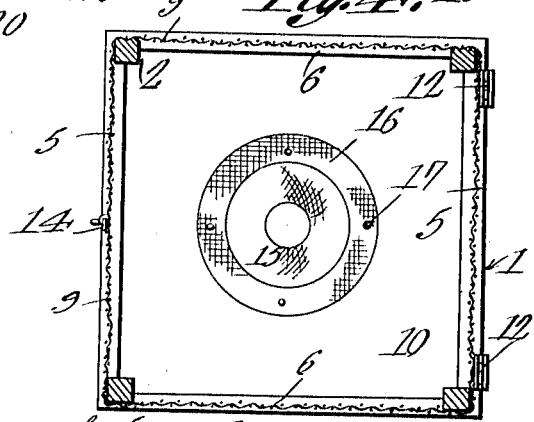
Figures 5, 6:
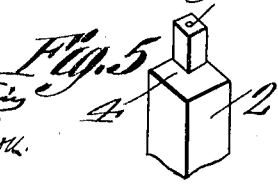

In the drawing:—Figure 1 is a side elevation; Fig. 2 is a longitudinal section; Fig. 3 is a top plan; Fig. 4 is a cross section; Fig. 5 is a perspective showing one end of the corner posts; and Fig. 6 is a transverse section through the frame forming strips and the corner post.

In carrying out the invention there is provided a receptacle which is denoted generally by the numeral 1, the same comprising a plurality of corner posts 2, terminated at their ends in reduced extensions 3, defining transverse shoulders 4. Upper and lower frames are provided, the frame comprising primary strips 5 and secondary strips 6. The strips 5 and 6 abut at their edges against the shoulder 4, the strips 5 and 6 abutting laterally against the side faces of the extensions 3. The primary strips 5 extend the full width of the structure, and the secondary strips 6 abut at their ends against the inner faces of the primary strips 5, as will be understood best from a comparison of Figs. 1 and 6. If desired, securing elements 8 may be extended through the strips 5 and 6, into engagement with the extensions 3 of the corner posts 2. The posts 2 and the strips 5 and 6 are surrounded upon their outer faces by a foraminous covering 9, and when the covering 9 is in place, the covering will serve to hold the strips 5 and 6 engaged with each other and engaged with the parts 3 and 4 of the corner posts 2.

The invention further includes a base 10 having a central opening 11, the base 10 being secured to the receptacle 1 by means of one or more hinges 12 which are united with the lower frame of the receptacle. A latch, taking the form of a hook and eye 14 or like structure, is employed for securing the free edge of the base 10 to the lower frame of the receptacle. A cone-shaped leader, open at its apex, is provided, the leader 15 having a flange 16 which is applied to the upper face of the base 10, about the periphery of the opening 11 therein, securing elements 17 being passed through the flange 16 into engagement with the base 10, to hold the leader 15 in place. The leader 15 is preferably fashioned from fine mesh wire screen. The base 10 carries depending legs 18, whereby the base is spaced apart from the support on which the trap is mounted.

The invention further includes a top 19, securing elements 20 being passed through the top 19, into engagement with the upper ends of the extensions 3 of the corner posts 2. The top 19, therefore, is rigidly assembled with the receptacle. In the central portion of the top 19 and alined vertically with the apex of the leader 15 is an opening 21. The opening 21 is controlled by a closure 22, mounted to slide upon the upper face of the top 19, the closure 22 being held in place pivotally by means of a screw, pin or like element which passes through a projecting ear 22', formed at the periphery of the closure 22. A bail 24 is shown, the same being pivotally engaged with ears 25 which are inserted into the upper face of the top 19.

In practical operation, the bait is placed within the receptacle, or upon the support, beneath the base 10, and the insects being attracted by the bait, will pass beneath the base 10 and will fly upwardly through the leader 15 into the interior of the receptacle 1, from which they will not retreat, through the leader 15, by reason of the fact that the opening at the apex of the leader 15 is relatively small. Access may be had to the interior of the receptacle 1 by disconnecting the hook and eye union 14, whereupon the receptacle 1 may be swung to one side readily, upon the hinges 12.

The pivotal connection 12 between the tubular body and the base of the trap, and the pivotal mounting 23 of the closure 22 lie upon opposite sides of the openings 21 and 11. As a consequence, when the tubular body is swung to one side, to remove dead flies and to remove old bait, the closure 22 will remain in place across the opening 21 and consequently, the flies will not escape from the top of the trap. The eyes in which the bail 24 is mounted constitute stops adapted to engage the periphery of the closure 22. The closure 22, therefore, may be moved to a limited extent in opposite directions, but a portion of the closure 22 will be maintained at all times above the apex of the leader 15. At times it is desirable to renew the bait by inserting the same through the opening 21. Because the closure 22 is at all times maintained above the apex of the leader 15 in the manner hereinbefore described, no portion of the bait, when introduced into the trap through the opening 21 will pass downwardly through the interior of the leader 15 and through the trap.

Having thus described the invention what is claimed is:—

A trap comprising a base having an opening; a leader secured to the base about the opening; a tubular body resting on the base and having an opening in its top; a closure for the opening and mounted to move parallel to the top; a hinge uniting the body with the base; and a pivot element uniting the closure with the top of the body, the pivot element and the hinge lying upon opposite sides of a line perpendicular to the base, whereby when the body is swung upon the hinge into an open position, the closure will remain gravitationally over the opening and prevent the escape of insects from the trap.

In testimony that I claim the foregoing as my own, I have hereto affixed my signature in the presence of two witnesses.

JEPTHA P. DAVIS.

Witnesses:
JOHN O. MAY,
HARLAN MAY.